US010480459B2

(12) United States Patent
Emrich et al.

(10) Patent No.: US 10,480,459 B2
(45) Date of Patent: Nov. 19, 2019

(54) EXHAUST GAS RECIRCULATION LINE EMBODIED TO BE PARTIALLY FLEXIBLE

(71) Applicant: Mahle International GmbH, Stuttgart (DE)

(72) Inventors: Karsten Emrich, Stuttgart (DE); Vahid Havaldar, Stuttgart (DE); Gaelle Schmidgall, Stuttgart (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 16/039,312

(22) Filed: Jul. 18, 2018

(65) Prior Publication Data

US 2019/0048833 A1   Feb. 14, 2019

(30) Foreign Application Priority Data

Jul. 19, 2017   (DE) .................. 10 2017 212 393

(51) Int. Cl.
| | |
|---|---|
| F02M 26/00 | (2016.01) |
| F02M 26/12 | (2016.01) |
| F16L 11/15 | (2006.01) |
| F02M 26/11 | (2016.01) |
| F02M 26/19 | (2016.01) |
| F02M 35/10 | (2006.01) |

(52) U.S. Cl.
CPC ............ *F02M 26/12* (2016.02); *F02M 26/11* (2016.02); *F02M 26/19* (2016.02); *F02M 35/10222* (2013.01); *F16L 11/15* (2013.01)

(58) Field of Classification Search
CPC .. F02M 26/11; F02M 26/12; F02M 35/10222; F16L 11/15
See application file for complete search history.

(56) References Cited

U.S. PATENT DOCUMENTS

| | | | | | |
|---|---|---|---|---|---|
| 1,645,347 | A * | 10/1927 | Pierson | ................ | F02M 31/087 123/547 |
| 1,793,556 | A * | 2/1931 | Moore | ................... | F02M 21/00 123/568.17 |
| 4,565,166 | A * | 1/1986 | Takeda | ................... | F02B 27/02 123/184.55 |
| 5,188,086 | A * | 2/1993 | Adkins | .................. | F02M 26/12 123/568.27 |
| 5,806,480 | A * | 9/1998 | Maeda | ............ | F02M 35/10019 123/184.57 |
| 6,293,265 | B1 | 9/2001 | Gagnon | | |
| 6,513,507 | B2 * | 2/2003 | Balekai | .................. | F02B 75/22 123/568.12 |

(Continued)

FOREIGN PATENT DOCUMENTS

| | | |
|---|---|---|
| EP | 2 133 547 A1 | 12/2009 |
| FR | 2 879 262 A1 | 6/2006 |

(Continued)

OTHER PUBLICATIONS

English abstract for FR-2 879 262.

*Primary Examiner* — Hieu T Vo
*Assistant Examiner* — Sherman D Manley
(74) *Attorney, Agent, or Firm* — Fishman Stewart PLLC

(57) ABSTRACT

An exhaust gas recirculation line may include an at least partially flexible body. The body may include a pipe section at an end. The pipe section may be closed on a front side and may include at least two openings on a jacket side.

20 Claims, 1 Drawing Sheet

(56) References Cited

U.S. PATENT DOCUMENTS

| | | | | |
|---|---|---|---|---|
| 7,631,726 | B2* | 12/2009 | McWilliam | F02M 35/1211 |
| | | | | 181/206 |
| 7,699,036 | B2* | 4/2010 | Bock | F02B 29/0425 |
| | | | | 123/184.61 |
| 9,435,472 | B2* | 9/2016 | Rickettson | F16L 33/221 |
| 9,494,113 | B2* | 11/2016 | Stec | F02M 35/10137 |
| 9,657,693 | B2* | 5/2017 | Berisha | B01D 46/0036 |
| 2005/0247294 | A1* | 11/2005 | Rowells | F01N 13/10 |
| | | | | 123/568.17 |
| 2010/0040465 | A1* | 2/2010 | Moran | F01N 13/1816 |
| | | | | 415/213.1 |
| 2017/0138318 | A1 | 5/2017 | Brygard et al. | |
| 2018/0030876 | A1* | 2/2018 | Miyoshi | F01N 3/08 |

FOREIGN PATENT DOCUMENTS

| | | |
|---|---|---|
| WO | 2010/109104 A1 | 9/2010 |
| WO | 2011/145136 A1 | 11/2011 |

\* cited by examiner

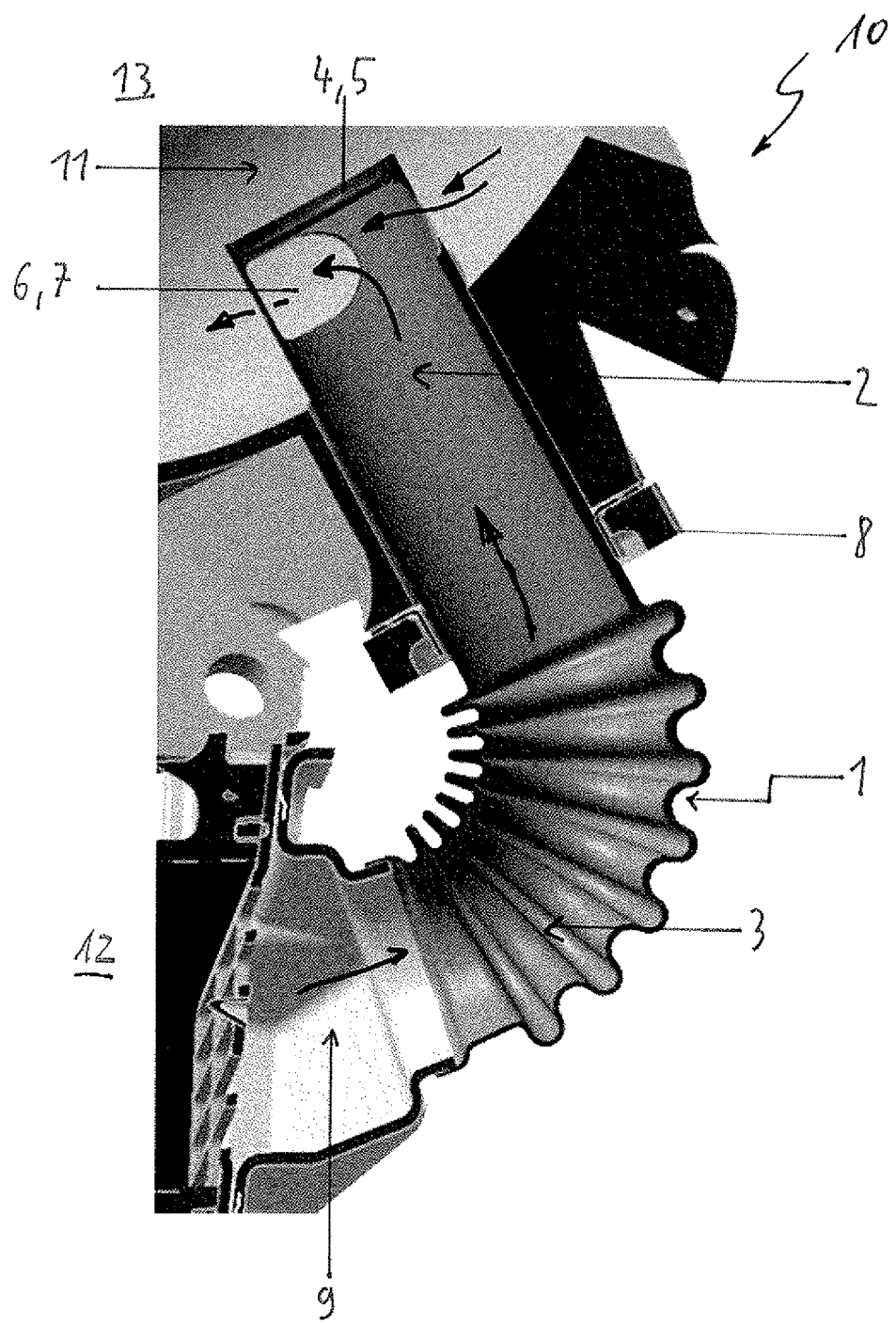

EXHAUST GAS RECIRCULATION LINE EMBODIED TO BE PARTIALLY FLEXIBLE

CROSS-REFERENCE TO RELATED APPLICATIONS

This application claims priority to German Patent Application No. DE 10 2017 212 393.1, filed on Jul. 19, 2017, the contents of which are hereby incorporated by reference in its entirety.

TECHNICAL FIELD

The present invention relates to a generic exhaust gas recirculation line. The invention also relates to an exhaust gas recirculation cooler and an internal combustion engine comprising such an exhaust gas recirculation line.

BACKGROUND

A generic exhaust gas recirculation line is known from EP 2 133 547 A1, in the case of which an exhaust gas recirculation module is assembled as a unit in an intake line between the upstream part and the downstream part of an air inlet system. The exhaust gas recirculation module comprises an inlet opening for an air flow and an inlet opening for an exhaust gas flow. The exhaust gas recirculation module also comprises a mixing arrangement, which serves to mix the exhaust gas introduced via the exhaust gas inlet opening and the air introduced via the air inlet opening. The exhaust gas recirculation module further comprises an outlet opening, from which the flow of exhaust gas and air, which is mixed by the mixing arrangement, can escape from the exhaust gas recirculation module.

Exhaust gas is guided back into the intake line after the cooling in an exhaust gas recirculation cooler. It is necessary thereby to mix the recirculated exhaust gas with new intake air. For this purpose, a deflector or another mixing arrangement is used for the most part, which mixes the exhaust gas with the new intake air before the mixed flow of new intake air and exhaust gas is guided back into an internal combustion engine via the intake line. It is disadvantageous hereby that these components have to be assembled separately. This represents an additional step in the production process of an exhaust gas recirculation cooler, which is costly as well as time-consuming.

It is in particular a disadvantage in the prior art that high costs are created or that the assembly effort for this mixing arrangement in the intake line is very high, respectively, as a result of the assembly of a mixing arrangement.

SUMMARY

The present invention thus deals with the problem of specifying an improved or at least alternative embodiment, which overcomes in particular the disadvantages known from the prior art, for an exhaust gas recirculation line of the generic type.

According to the invention, this problem is solved by means of the subject matter of the independent claim(s). Advantageous embodiments are the subject matter of the dependent claim(s).

The present invention is based on the general idea of providing an exhaust gas recirculation line, in the case of which the exhaust gas recirculation line is embodied to be at least partially flexible and has a pipe section, which is closed on the front side on one end, wherein the pipe section, which is closed on the front side, is closed by a cover and has at least two openings on the jacket side. The end of the pipe section, which is closed on the front side, can be connected to an intake line of an internal combustion engine and simultaneously serves as deflector/mixing arrangement for mixing recirculated and cooled exhaust gas and new intake air. On the end of the exhaust gas recirculation line, which faces away from the pipe section, said exhaust gas recirculation line is connected to an exhaust gas recirculation cooler via a flange, wherein the exhaust gas recirculation cooler and the intake line of the internal combustion engine can be arranged in different constellations relative to one another. According to the invention, the exhaust gas recirculation line is embodied so as to be partially flexible, whereby it becomes easier to connect it to the exhaust gas recirculation cooler and to the intake line of the internal combustion engine, namely independently of the constellation, in which the internal combustion engine and the exhaust gas recirculation cooler are arranged relative to one another. The two openings on the jacket side serve the purpose of mixing the new intake air with the exhaust gas in the pipe area, which is closed on the front side. Not only a simplified assembly, but also a prefabrication of an assembly consisting of a mixing arrangement and exhaust gas recirculation line can be attained by means of the exhaust gas recirculation line according to the invention.

A possible embodiment proposes that, on the end of the flexible area, the exhaust gas recirculation line has a flange for connection to an exhaust gas recirculation cooler. A simple assembly of the exhaust gas recirculation line to the exhaust gas recirculation cooler can be attained via the flange and an assembly, which can be prefabricated, can thus be created. The end of the pipe section, which is closed on the front side, is thereby connected to the intake line of the internal combustion engine, and the flexible area provides for an angling of the flange for flanging to the exhaust gas recirculation cooler. The flexible area also makes it possible to compensate assembly tolerances. This is advantageous, because a stable and cost-efficient assembly is made possible in this way. Such an assembly further saves time, because the assembly of the exhaust gas recirculation line, which is connected to the exhaust gas recirculation cooler, to the internal combustion can take place in a single step.

A further possible embodiment proposes that a bellows section is arranged between the pipe section, which is closed on the front side, and the flange, by means of which the exhaust gas recirculation line can be connected to the exhaust gas recirculation cooler of the internal combustion engine. In this embodiment, the flexibly embodied area of the exhaust gas recirculation line is a bellows section. This is advantageous, because this bellows section makes it possible to attain the desired flexibility with a simultaneously stable line.

In an alternative embodiment, the pipe section and the bellows section can be embodied in one piece. It is advantageous to embody the pipe section and the flexible bellows section in one piece, because the time and cost expenditure can thus be reduced during the production, because the pipe section, which is closed on the front side, and the flexible bellows section can be produced in a single step. It is also advantageous, because a connection between pipe section and bellows section does not exist in this way, which may loosen in some cases.

It can advantageously be provided that the closure of the pipe section, which is closed on the front side, is a cover. Such a cover can be assembled easily to the end of the pipe section on the front side or can be inserted therein, respectively. Such a cover can also be produced as cost-efficient shaped sheet metal part or plastic part.

It can preferably be provided that the at least two openings on the jacket side are arranged so as to be located opposite one another on the end of the pipe section, which is closed on the front side, wherein the openings on the jacket side can be embodied as elongated holes, which extend in the circumferential direction. The new intake air and the exhaust gas are to be mixed with one another in the pipe section, which is closed on the front side, before the mixture of air and exhaust gas is guided back into the internal combustion engine via the intake line. It is advantageous thereby when the pipe section has openings on the jacket side, which are located opposite one another. This is also favorable from a fluidic aspect, whereby a flow resistance can be reduced. It goes without saying that a plurality of openings on the jacket side can also be provided on the two sides of the pipe section.

It is a further advantageous embodiment when a fastening console is arranged in such a way on the pipe section that the fastening console engages around the pipe section. The fastening console is arranged between the end of the pipe section, which is closed on the front side, and the bellows section, and provides for a fastening of the pipe section to the intake line of the internal combustion engine.

It can be provided in a possible embodiment that the pipe section, which is closed on the front side, is rotatably arranged in the fastening console. As a result of the rotatable arrangement of the pipe section in the fastening console, the openings on the jacket side, which extend in the circumferential direction of the pipe section, can also be rotated. This is advantageous, because the pipe section can thus be rotated in the fastening console in such a way that the openings on the jacket side are located in the intake line in the desired angle of flow. The fastening console secures the pipe section, which is closed on the front side, and thus the openings on the jacket side, in the respectively desired position.

Advantageously, it can be provided that the exhaust gas recirculation line is arranged on the exhaust gas recirculation cooler and is delivered as combined assembly. This is advantageous, because the exhaust gas recirculation line and the exhaust gas circulation cooler can be embodied as assembly, which can be prefabricated, in this way. Such an assembly further saves time, because the exhaust gas recirculation line is already assembled to the exhaust gas recirculation cooler and does not have to be assembled in an additional assembly step in response to the production of the internal combustion engine.

In a preferred embodiment, the at least two openings on the jacket side can be arranged in the intake line so as to be aligned in the flow direction on the end of the pipe section, which is closed on the front side. It is advantageous to arrange the openings of the pipe section on the jacket side in the intake line so as to be aligned, because it is ensured in this way that the flow of fresh air and exhaust gas, which is to be mixed, hit one another perpendicularly, whereby an optimal mixing of the two flows takes place in the pipe section, which serves as deflector.

Further important features and advantages of the invention follow from the subclaims, from the drawing, and from the corresponding FIGURE description by means of the drawing.

It goes without saying that the above-mentioned features and the features, which will be described below, cannot only be used in the respective specified combination, but also in other combinations, or alone, without leaving the scope of the present invention.

A preferred exemplary embodiment of the invention is illustrated in the drawing and will be described in more detail in the description below.

BRIEF DESCRIPTION OF THE DRAWINGS

FIG. 1 shows a schematic illustration of an exhaust gas recirculation line according to the invention, wherein the exhaust gas recirculation line according to the invention is connected to an exhaust gas recirculation cooler and the intake tract of an internal combustion engine.

DETAILED DESCRIPTION

According to FIG. 1, an exhaust gas recirculation line 1 has a pipe section 2 and a flexible bellows section 3. The pipe section 2 and the bellows section 3 thereby preferably form a one-part or one-piece component. The pipe section 2 has a closure 4 on the front side, which is arranged on the free end of the pipe section 2, wherein the closure 4 on the front side is embodied as cover 5. The pipe section 2 further has openings 6 on the jacket side, which are embodied as elongated holes 7 and which extend around the pipe section 2 in the circumferential direction.

It is important to emphasize thereby that the pipe section 2 is fastened to an intake tract of an internal combustion engine 10 via a fastening console 8 in the example of FIG. 1, wherein the fastening console 8 is arranged on the end of the pipe section 2, which transitions into the bellows section 3. As a result of the bellows section 3, which connects to the pipe section 2, the exhaust gas recirculation line 1 is embodied to be partially flexible.

As illustrated in FIG. 1, the fastening console 8 is arranged on the one end of the bellows section 3, and a flange 9 is arranged on the other end of the bellows section 3. As a result of the flexibly embodied bellows section 3, the pipe section 2 can be positioned at a variable angle to the flange 9. It is thus theoretically possible that the flange 9 and the pipe section 2, which is fastened by means of the fastening console 8, are located opposite one another so as to be aligned or that the bellows section 3 and the pipe section 2 form a straight line, respectively. In FIG. 1, the bellows section 3 is curved by approx. 90° between the flange 9 and the pipe section 2, which is fastened by means of the fastening console 8. The exhaust gas recirculation line 1 is fastened to an exhaust gas recirculation cooler 12 by means of the flange 9. The exhaust gas recirculation cooler 12 and the exhaust gas recirculation line 1 can thereby form a prefabricated assembly.

The pipe section 2, which connects to the bellows section 3, thereby protrudes with its closure 4 on the front side and the openings 6 on the jacket side into an intake tract 11 of the internal combustion engine 10. An intake line 13 is located in the intake tract 11.

An exhaust gas recirculation line 1, which is embodied to be at least partially flexible and which, on one end, has a pipe section 2, which is closed on the front side, and at least two openings on the jacket side, can be provided with the present invention. The end of the pipe section 2, which is closed on the front side, thereby serves as deflector/mixing arrangement for mixing circulated and cooled exhaust gas and new intake air. The exhaust gas recirculation line 1 is thereby embodied to be partially flexible, whereby it is made simpler to connect the latter to the exhaust gas circulation cooler 12 and to the intake line 13 of the internal combustion engine 10, namely independently of the constellation, in which the internal combustion engine 10 and the exhaust gas recirculation cooler 12 are arranged relative to one another. Not only a simplified assembly, but also a prefabrication of an assembly consisting of mixing arrangement and exhaust gas recirculation line 1 can be attained by means of the exhaust gas recirculation line 1 according to the invention. Production tolerances can also be compensated more easily by means of the flexible exhaust gas recirculation line 1 according to the invention.

The invention claimed is:

1. An exhaust gas recirculation line comprising:
   an at least partially flexible body;
   body including a pipe section at an end, the pipe section closed on a front side and including at least two openings on a jacket side.

2. The exhaust gas recirculation line according to claim 1, wherein the body further includes a flange configured to couple to an exhaust gas recirculation cooler.

3. The exhaust gas recirculation line according to claim 2, wherein the body further includes a flexible bellows section arranged between the pipe section and the flange.

4. The exhaust gas recirculation line according to claim 3, wherein at least the pipe section and the bellows section are integrally provided as a single piece and define the body.

5. The exhaust gas recirculation line according to claim 1, wherein the front side of the pipe section is closed by a cover.

6. The exhaust gas recirculation line according to claim 1, wherein at least one of:
   the at least two openings are arranged on the jacket side opposite one another; and
   the at least two openings are structured as elongated holes extending in a circumferential direction of the pipe section.

7. The exhaust gas recirculation line according to claim 1, further comprising a fastening console engaging around the pipe section and arranged on the pipe section.

8. The exhaust gas recirculation line according to claim 7, wherein the pipe section is rotatably arranged in the fastening console.

9. An exhaust gas recirculation cooler comprising:
   an at least partially flexible exhaust gas recirculation line including a pipe section, the pipe section closed on a front side and including at least two openings on a jacket side.

10. The exhaust gas recirculation cooler according to claim 9, wherein the exhaust gas recirculation line further includes a flange coupling the exhaust gas recirculation line to the exhaust gas recirculation cooler.

11. The exhaust gas recirculation cooler according to claim 10, wherein the exhaust gas recirculation line further includes a flexible bellows section arranged between the pipe section and the flange.

12. The exhaust gas recirculation cooler according to claim 11, wherein at least the pipe section and the bellows section are integrally provided as a single piece and define the exhaust gas recirculation line.

13. The exhaust gas recirculation cooler according to claim 9, wherein:
   the front side of the pipe section is closed by a cover; and
   at least one of:
      the at least two openings are arranged on the jacket side opposite one another; and
      the at least two openings are structured as elongated holes extending in a circumferential direction of the pipe section.

14. An internal combustion engine comprising:
   an exhaust gas recirculation cooler including an at least partially flexible exhaust gas recirculation line, the exhaust gas recirculation line including a pipe section, the pipe section closed on a front side and including at least two openings on a jacket side; and
   an intake tract including an intake line;
   wherein the pipe section of the exhaust gas recirculation line is arranged within the intake line and coupled thereto via a fastening console.

15. The internal combustion engine according to claim 14, wherein the at least two openings are arranged in the intake line and aligned in a flow direction of the intake line.

16. The internal combustion engine according to claim 14, wherein the exhaust gas recirculation line further includes a flange coupling the exhaust gas recirculation line to the exhaust gas recirculation cooler.

17. The internal combustion engine according to claim 16, wherein the exhaust gas recirculation line further includes a flexible bellows section arranged between the pipe section and the flange.

18. The internal combustion engine according to claim 17, wherein at least the pipe section and the bellows section are integrally provided as a single piece and define the exhaust gas recirculation line.

19. The internal combustion engine according to claim 14, wherein the front side of the pipe section is closed by a cover.

20. The internal combustion engine according to claim 14, wherein at least one of:
   the at least two openings are arranged on the jacket side opposite one another; and
   the at least two openings are structured as elongated holes extending in a circumferential direction of the pipe section.

* * * * *